United States Patent [19]
Johnson

[11] Patent Number: 5,401,480
[45] Date of Patent: * Mar. 28, 1995

[54] REMOVAL OF SULFUR AND NITROGEN OXIDES FROM FLUE GASES

[75] Inventor: Arthur F. Johnson, Boulder, Colo.

[73] Assignee: Energy Conservation Partnership Ltd., Boulder, Colo.

[*] Notice: The portion of the term of this patent subsequent to Jun. 16, 2009 has been disclaimed.

[21] Appl. No.: 222,788

[22] Filed: Apr. 4, 1994

Related U.S. Application Data

[60] Continuation-in-part of Ser. No. 97,783, Jul. 26, 1993, Pat. No. 5,344,617, which is a division of Ser. No. 888,931, May 26, 1992, Pat. No. 5,230,870, which is a continuation-in-part of Ser. No. 730,417, Jul. 16, 1991, Pat. No. 5,273,727, and a continuation-in-part of Ser. No. 731,830, Jul. 16, 1991, Pat. No. 5,198,201, which is a continuation-in-part of Ser. No. 567,492, Aug. 14, 1990, Pat. No. 5,122,352.

[51] Int. Cl.$^6$ ............................................. C01B 17/00
[52] U.S. Cl. .................................. 423/243.06; 422/169
[58] Field of Search ............... 423/243.06, 243.11, 423/243.01; 422/169

[56] References Cited

U.S. PATENT DOCUMENTS

| | | | |
|---|---|---|---|
| 1,709,865 | 4/1929 | Muffly | 29/890.035 |
| 1,712,085 | 5/1929 | Litle | 62/523 |
| 2,109,780 | 3/1938 | Mott | 36/1 |
| 2,159,043 | 5/1939 | Orr | 29/189 |
| 2,174,792 | 10/1939 | Lampton | 29/1575 |
| 2,212,481 | 8/1940 | Sendzimir | 27/188 |
| 2,234,839 | 3/1941 | Edwards | 18/56 |
| 2,244,475 | 6/1941 | Raskin | 62/126 |
| 2,294,137 | 8/1942 | Spofford | 148/4 |
| 2,399,650 | 5/1946 | Moyer | 250/83 |
| 2,438,851 | 3/1948 | Gates | 257/6 |
| 2,582,358 | 1/1952 | Schoellerman | 113/51 |
| 3,442,232 | 5/1969 | White | 110/18 |
| 3,456,928 | 7/1969 | Selway | 261/22 |
| 3,607,034 | 9/1971 | Henry et al. | 23/168 |
| 3,676,059 | 7/1972 | Welty | 423/242 |
| 3,770,385 | 11/1973 | Grey et al. | 23/260 |
| 3,839,849 | 10/1974 | Maniya | 55/222 |
| 3,880,618 | 4/1975 | McCrea et al. | 55/68 |
| 3,962,112 | 6/1976 | Shaheen | 423/243,06 |
| 4,051,225 | 9/1977 | Shiga et al. | 423/235 |
| 4,089,088 | 5/1978 | Konczalski | 23/277 |
| 4,101,635 | 7/1978 | Nambu et al. | 423/242 |
| 4,140,175 | 2/1979 | Darm | 165/45 |
| 4,160,810 | 7/1979 | Benson et al. | 423/220 |
| 4,250,160 | 8/1979 | Eakman | 423/547 |
| 4,339,883 | 7/1982 | Waldmann | 34/27 |
| 4,409,191 | 10/1983 | Osman | 423/720 |
| 4,444,128 | 4/1984 | Monro | 110/345 |
| 4,452,620 | 6/1984 | Dosmond | 62/238.6 |
| 4,454,100 | 6/1984 | Faatz | 423/210 |
| 4,466,815 | 8/1984 | Southam | 55/212 |
| 4,487,139 | 12/1984 | Warner | 110/345 |

FOREIGN PATENT DOCUMENTS

| | | |
|---|---|---|
| 0286892 | 3/1988 | European Pat. Off. |
| 3541252A1 | 9/1986 | Germany |
| 35972 | 6/1906 | Hong Kong |
| 55-105535 | 8/1980 | Japan |

OTHER PUBLICATIONS

"Ammonia Injection: A Route to Clean Stacks"; Shale; *Pollution Control And Energy Needs* pp. 195–205; Feb. 15, 1973.

Charles Hodgerman, Robert Weast, Samuel Selby; *Handbook of Chemistry and Physics;* 43rd Edition, pp. 1704–1709, 1712–1713 no date.

*Primary Examiner*—Michael Lewis
*Assistant Examiner*—Thomas G. Dunn, jr.
*Attorney, Agent, or Firm*—Pennie & Edmonds

[57] ABSTRACT

A system is provided for converting flue gas pollutants to useful ammonium sulfate byproducts in an instantaneous gas phase reaction between a gaseous ammoniacal substance and the sulfur oxides in the flue gas. The system also removes other pollutants by converting them into other harmless byproducts and collects useful ammonium sulfate compounds.

16 Claims, 1 Drawing Sheet (List continued on next page.)

U.S. PATENTS DOCUMENTS

| | | | |
|---|---|---|---|
| 4,526,112 | 7/1985 | Warner | 110/345 |
| 4,557,202 | 12/1985 | Warner | 110/216 |
| 4,582,122 | 4/1986 | Fan | 165/1 |
| 4,597,433 | 7/1986 | Johnson | 165/4 |
| 4,600,561 | 7/1986 | Frei | 422/170 |
| 4,619,671 | 10/1986 | Ruff et al. | 55/222 |
| 4,744,967 | 5/1988 | Brand et al. | 423/239 |
| 4,776,391 | 10/1988 | Warner | 165/111 |
| 4,781,797 | 11/1988 | Johnson | 202/173 |
| 4,783,326 | 11/1988 | Srednicki | 423/242 |
| 4,793,981 | 12/1988 | Doyle et al. | 423/239 |
| 4,802,897 | 2/1989 | Johnson | 55/55 |
| 4,829,911 | 5/1989 | Nielson | 110/234 |
| 4,871,522 | 10/1989 | Doyle | 423/239 |
| 4,874,585 | 10/1989 | Johnson et al. | 422/171 |
| 4,876,986 | 10/1989 | Johnson | 122/20 B |
| 4,900,403 | 2/1990 | Johnson | 203/78 |
| 4,910,011 | 3/1990 | Dörr et al. | 423/522 |
| 4,932,334 | 6/1990 | Patte et al. | 110/216 |
| 5,051,245 | 9/1991 | Wilson et al. | 423/242 |
| 5,122,352 | 6/1992 | Johnson | 423/242 |

OTHER PUBLICATIONS

P. G. L. Thorne & E. R. Roberts; *Fritz Ephraim Inorganic Chemistry;* 1943; pp. ix–xii, 178 and 694.

Ralph F. Bovier; *Proceedings of the American Power Conference;* Apr. 14, 15 & 16 1964; article entitled "Sulfur–Smoke Removal System"; pp. 138–143.

Raisaku Kiyoura, Haruo Kuronuma and Gisuke Uwanishi; *Bulletin of the Tokyo Institute of Technology;* No. 81, 1967; article entitled "Studies on the Recovery of Sulphur Dioxide from Hot Gases, to Control Air Pollution;" pp. 1–5.

REMOVAL OF SULFUR AND NITROGEN OXIDES FROM FLUE GASES

CROSS-REFERENCE TO RELATED APPLICATIONS

This application is a continuation-in-part of application Ser. No. 08/097,783 filed Jul. 26, 1993, now U.S. Pat. No. 5,344,617, which is a division of application Ser. No. 07/888,931 filed May 26, 1992, now U.S. Pat. No. 5,230,870, which is a continuation-in-part of application Ser. No. 07/730,417 filed Jul. 16, 1991, now U.S. Pat. No. 5,273,727 and a continuation-in-part of application Ser. No. 07/731,830 filed Jul. 16, 1991, now U.S. Pat. No. 5,198,201 which is a continuation-in-part of application Ser. No. 07/567,492 filed Aug. 14, 1990, now U.S. Pat. No. 5,122,352.

FIELD OF THE INVENTION

This invention relates to a system for the removal of noxious pollutants, including compounds of sulfur and nitrogen from boiler plant flue gases. It also relates to a system for production of ammonium sulfate by an instantaneous gas phase reaction.

BACKGROUND OF THE INVENTION

Boiler plants, particularly those having coal-fired boilers, are well-known sources of pollution. Sulfur emissions from these plants has become a matter of heightened concern in recent years, in light of the perceived effects of "acid rain." Although pollutant emission reduction has long been the object of scientific inquiry, there is still a great demand for methods and apparatus that are effective, easily retrofit onto existing plants, and which convert the collected pollutants into useful and valuable byproducts.

The prior art recognizes that cooling flue gases that contain sulfur trioxide and water vapor will result in condensation of sulfuric acid. See U.S. Pat. No. 4,526,112 to Warner; U.S. Pat. No. 4,874,585 to Johnson, et al.; U.S. Pat. No. 4,910,011 to Dorr, et al.; and Bovier, Sulfur-Smoke Removal System, 26 Proc. Am. Power Conf. 138 (1964). Other systems of the prior art employ high-volume sprays of water or other liquid agents to scrub particulate matter and pollutants from the flue gas. See U.S. Pat. No. 3,442,232 to White; U.S. Pat. No. 3,456,928 to Selway; and U.S. Pat. No. 3,770,385 to Grey et al.

It was further recognized that when a tube-type heat exchanger is located in the path of a flue gas flow, the particulate material in the gas can collect on the heat exchanger tubes. Cleansing sprays have been provided to accompany the heat exchanger according to some prior art methods to wash the collected particulate from the heat exchangers. See U.S. Pat. No. 4,452,620 to Dosmond; and U.S. Pat. No. 4,526,112 to Warner.

Although the aforementioned systems are more or less effective in removing some degree of the pollutants from the flue gas, they merely shift the environmental burden from atmospheric waste to surface waste. The prior art has recognized that strictly gas phase reactions in flue gas can produce ammonium sulfates or sulfites. See C. C. Shale, *Pollution Control and Energy Needs*. However, the prior art failed to grasp that these products could be collected and sold as fertilizer byproducts and that noxious pollutants can be removed from power plant flue gas by such reactions.

Attempts have therefore been made to convert pollutants into useful end products as they are removed from flue gases. My prior patents teach how to combine an ammoniacal substance with sulfur oxides in the flue gases to form ammonium sulfites or ammonium sulfates, either in the form of crystals (U.S. Pat. Nos. 5,198,201 and 5,230,870) or in a condensate solution (U.S. Pat. Nos. 5,122,352 and 5,273,727). Since ammonium sulfate is soluble in its own weight of water, this byproduct can be collected in the condensate from the cooled flue gas. However, ammonium sulfate forms crystals which can deposit upon heat exchanger tubes, so that the apparatus must be periodically cleansed with additional water. Thus, there is a need for improvement in the operation of such processes with regard to the collection and recovery of ammonium sulfate or related compounds for reuse as fertilizers or the like.

SUMMARY OF THE INVENTION

It is therefore an object of the present invention to provide a system for removing pollutants from flue gas by which substantially all oxides of sulfur and nitrogen are removed.

It is a further object of the invention to provide such a system in which the harmful pollutants are not merely removed from the flue gas to be disposed elsewhere, but are converted into useful and environmentally safe substances, particularly ammonium sulfate and ammonium sulfite.

It is another object of the invention to provide such a system in which the formation and collection of the useful byproducts does not cause obstruction of the gas flow or require means to cleanse the apparatus to prevent such an obstruction.

It is yet another object of the invention to provide such a system which is readily retrofit onto existing boiler plant exhaust equipment.

These and other objects of the present invention that would be apparent to one skilled in the art are provided by the present invention, which relates to a method of removing pollutants from hot flue gas by introducing an ammoniacal substance in the gaseous state into the flue gas at an amount sufficient to combine with substantially all of the sulphur oxides therein to form fine dry particles of ammonium sulfate; condensing the moisture of the flue gas with the sulfate compounds; collecting a condensate solution of the condensed compounds; and recovering ammonium sulfate from the condensate.

In this method, the preferred ammoniacal substances are ammonia or ammonium hydroxide. These compounds can be conveniently obtained in the gaseous state by heating a solution of between about 0.5 to 20% by weight of ammonia or ammonium hydroxide and water to provide the gaseous ammoniacal substance for introduction into the flue gas.

Advantageously, the gaseous ammoniacal substance is heated to approximately the same temperature as the flue gas prior to introduction thereto. Also, the temperature of the flue gas when the ammoniacal substance is injected is at least about 370° F. The flue gas and the introduced gaseous ammoniacal substance are provided with a sufficient residence time to substantially complete the formation of the fine dry crystals prior to condensing moisture from the flue gas. The flue gas generally passes through preheaters and it is possible to introduce the ammoniacal substance into the flue gas stream ahead upstream of preheaters to make a fog of fine ammonium sulfate crystals.

The method also provides for thoroughly removing soot and tars from the flue gas prior to the injection of the ammoniacal substance. This can be conducted by passing the hot flue gas through a baghouse or similar particulate removal device. Thereafter, the flue gas is condensed by cooling to form a condensate which contains substantially all of the ammonium sulfate compounds therein. Preferably, the flue gas is condensed by exchanging heat between the flue gas and a cooling fluid through first heat exchanger tubes which carry the cooling fluid. Ambient temperature water can be used as the cooling fluid and it is heated to produce steam which can be used to develop power for use in the plant, e.g., by driving a fan, pump or electric generator to develop power. A typical application would be to operate a reciprocating steam pump which pumps water to a hydroelectric generator at between about 5 and 1000 times the pressure per square inch of the steam.

In an alternative embodiment of the invention, the ammoniacal substance may be introduced into the flue gas stream ahead of the air preheater to make a fog of ammonium sulfate. This ammonium sulfate fog will not be corrosive to the air preheater or flue gas conduits which precede the condensing heat exchanger.

The invention provides for the substantially complete conversion of sulfur and nitrogen pollutants to substantially pure and useful products, while cooling the flue gas in heat exchange with boiler feedwater.

DETAILED DESCRIPTION OF THE PREFERRED EMBODIMENTS

Figure 1:
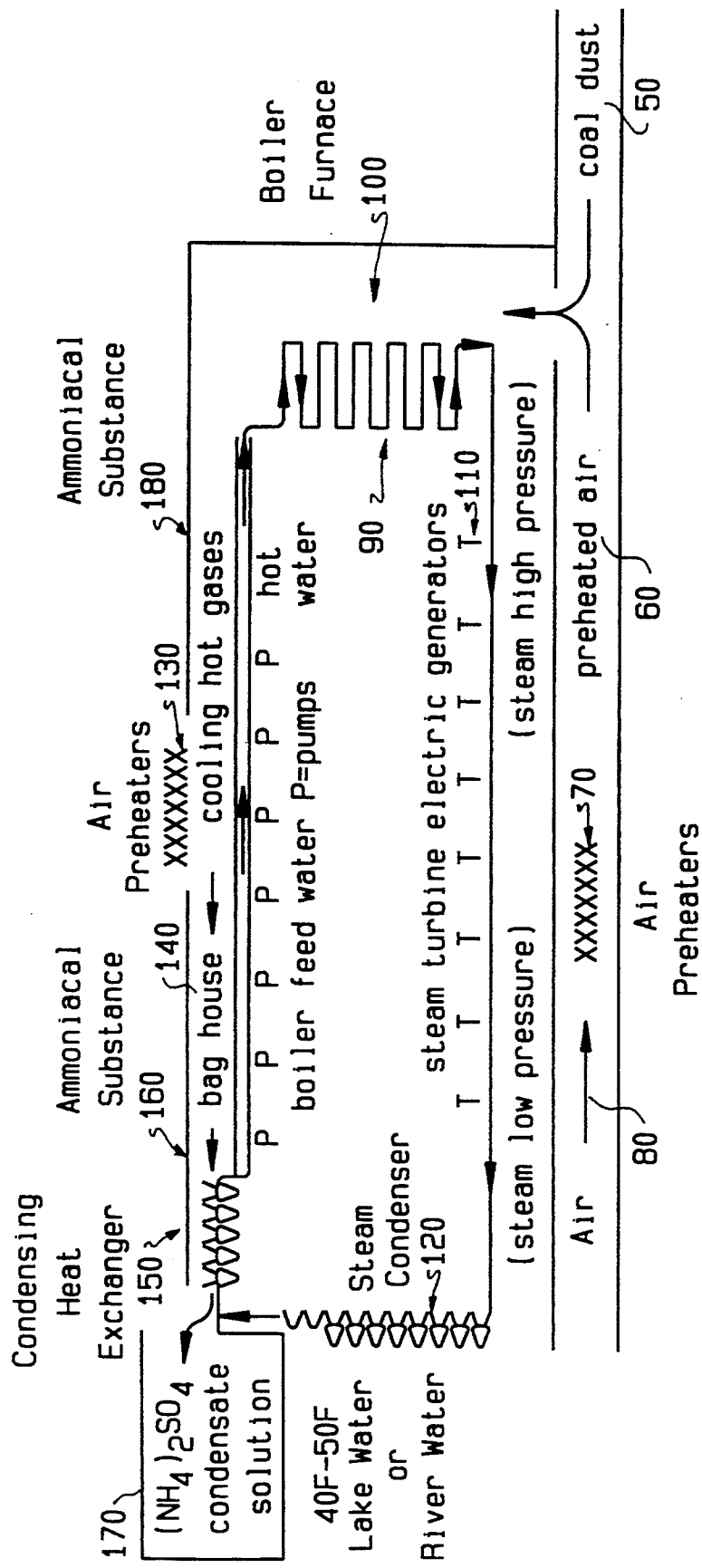
FIG. 1 is a flow chart showing the arrangement of the components of the present invention along the flows of flue gas and boiler feedwater in a typical plant application.

U.S. Pat. Nos. 5,122,352 and 5,198,201 are hereby expressly incorporated by reference herein for their disclosure of a condensing heat exchanger which is the type that can be used to conduct the present process.

The operation of the preferred embodiment of the present invention may be appreciated by reference to FIG. 1. According to this embodiment, ammonium sulfate or ammonium sulfite, useful as fertilizer, is formed by the introduction of a sufficient amount of an ammoniacal substance such as ammonia or ammonium hydroxide into the flue gas at certain specified locations.

The flow chart of FIG. 1 shows the basic configuration of a power plant which has been outfitted with the pollution control system of the present invention. In a typical power plant, the coal to be burned is pulverized into dust 50 and is combined with air 60 that has been preheated in conventional air preheaters 70 which heat atmospheric air 80. This forms the fuel which is burned in a boiler furnace 100 which heats the tubes of a heat exchanger 90 to produce steam.

The steam is used to drive turbines 110 to generate electricity. The steam enters the turbines at high pressure and exit at low pressure. The low pressure steam is then directed to a condenser 120 which cools and condenses the steam using river or lake water, thus returning it to the boiler feedwater state. The cooled feedwater exits the condenser at about 70° F.

Flue gas leaving the boiler is first cooled by air preheaters 130. The flue gas is next directed through a baghouse 140 to remove particulates, such as flyash. This serves two purposes. First, the adverse effects of particulate pollutants on the desired reaction is minimized by their removal. Second, the byproducts obtained downstream are not contaminated with unwanted matter. The flue gas at a temperature of about 370° F. then passes to a condensing heat exchanger 150 of the type described above in my earlier patents.

As a matter of chemistry, it has long been known that the presence of certain substances can retard reactions between other substances. Such a "negative catalyst", effect is pertinent here because the effectiveness of the present pollutant removal system depends on complete reactions between ammoniacal substances and flue gas pollutants, as detailed below.

Flyash and other particulate in the flue gas contain matter that can act as a negative catalyst to the reactions sought by the present invention. One of those reactions is the oxidation of $SO_2$ in the flue gas to $SO_3$ in order to produce ammonium sulfate rather than ammonium sulfite as a by-product. The reaction also consumes oxides of nitrogen, which are converted to harmless pure nitrogen.

Some of the particulates in the flue can inhibit these desired gas phase reactions. For example, flue gas contains phenol, which has just such a negative effect. See F. Ephraim, *Inorganic Chemistry* (4th ed. 1943). The present invention prevents the phenomenon from inhibiting full conversion of sulfur oxides to safe and useful by-products, by locating the baghouse 140 or similar particulate filtration means ahead of the other system components. The baghouse 140 is very important to avoid soot and tars in the flue gas which poison the gas reactions by coating the constituents with a film. Substantially all particulates are removed by the baghouse 140.

The flue gas will likely cool down to a temperature of between about 500° F. and 400° F. in the baghouse. Thereafter, the flue gas enters a condensing heat exchanger 150 in which heat is exchanged between the flue gas and boiler feedwater. An ammoniacal substance 160 such as ammonia or ammonium hydroxide is introduced to the flue gas downstream of the baghouse and upstream of the heat exchanger in an amount sufficient to combine with substantially all $SO_2$ and $SO_3$ in the flue gas and produce minute dry crystals of ammonium sulfate or ammonium sulfite according to the following reaction:

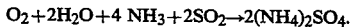

$$O_2 + 2H_2O + 4\,NH_3 + 2SO_2 \rightarrow 2(NH_4)_2SO_4.$$

This reaction, which is not reversible, generates about 22 Btu/lb. ammonium sulfate.

This invention requires that the ammoniacal substance be introduced in the gaseous state in order to obtain an instantaneous reaction with the sulfur oxides of the flue gas. To obtain the ammoniacal substance in gaseous form, a solution of the substance and water can be heated. Alternatively, gaseous ammoniacal substances such as warm ammonia gas can be used. If desired, the gas can be heated to approximately the same temperature as the flue gas to avoid premature cooling of the flue gas and obtain high reactivity, In an alternative embodiment of the invention, the ammoniacal substance may be introduced into the flue gas stream at 180 ahead of the air preheater 130 to make a fog of ammonium sulfate crystals. Again, the ammoniacal substance is introduced in the gaseous state and is heated if desired. Since the acid dewpoint for high sulfur coal is about 320° F. and ammonium sulfate does not decompose until about 536° F., the ammonium sulfate crystals will remain intact and not decompose. Thus, the fog will not be corrosive to the air preheater 130 or flue gas conduits which precede the condensing heat exchanger 150. Since sulfuric acid is converted to ammonium sulfate, this invention eliminates the so called "acid dewpoint" corrosion in power plant air preheaters and conduits for flue gas.

The dry crystals of ammonium sulfate compounds which form are recovered in the moisture that condenses from the flue gas at about 125° F. in the condensing heat exchanger 150 as a concentrated ammonium sulfate solution 170. Depending upon the sulfur oxide content of the flue gas, ammonium sulfite may also be present in this first condensate solution.

A second condensate is drawn off from the condensing heat exchanger at a lower level, and thus at a slightly lower temperature, to collect any soluble or insoluble compounds not caught in the first condensate. This second condensate may be injected into the flue gas flow stream above, preferably at a higher temperature of flue gas than that where the ammoniacal substance has been injected, e.g., immediately after the flue gas has left the baghouse 140. The details of ammonia injection for the second condensate is fully explained in U.S. Pat. No. 5,122,352 and need not be repeated here.

The foregoing process is capable of removing substantially all sulfur oxides from the flue gas. Moreover, the bulk of sulfur pollutants in the form of sulfur dioxide will be oxidized to sulfur trioxide so that the most desired byproduct, ammonium bisulfate, is obtained. This oxidation occurs in part as a result of the production of nitrogen dioxide, $NO_2$, when ammonia, $NH_3$, is "burned" in the high temperature flue gas. $NO_2$ is an excellent oxidizing agent. Oxidation can always be affected by the addition of other oxidizing agents as well, such as oxygen or air.

The tubes of the condensing heat exchanger 150 need not be coated with acid-resistant material. Unlike many prior art systems, sulfuric acid is not the product of this pollutant removal process. Nevertheless, it may be desirable to provide a protective coating (e.g., Nylon or Teflon) anyway, to guard against acid condensation resulting from inadequate provision of ammonia. A coating is also beneficial for preventing abrasion to the steel or iron pipes that would normally be used. The coating must withstand the high temperatures of flue gas, and also have satisfactory heat exchange properties.

The embodiment of the invention is easily retrofit to existing power plants and is capable of removing substantially all sulfur oxide pollutants from the flue gas stream. The gas released after treatment with the invention has about the following composition: 70% by weight $N_2$, 20% by weight $CO_2$, 4% by weight $O_2$ and 6% by weight $H_2O$. This is advantageously close to the make-up of the atmosphere which is roughly 77% by weight nitrogen, 23% by weight oxygen and 0.03% by weight $CO_2$. Hence high smoke stacks could be eliminated since the emissions are environmentally sound.

What is claimed is:

1. A method of removing pollutants from a power plant flue gas, which comprises:

removing particulates from a flue gas;

preparing a gaseous ammoniacal substance having approximately the same temperature as the flue gas;

introducing the ammoniacal substance into the flue gas in an amount sufficient to combine with substantially all of the sulphur oxides therein;

providing the combined flue gas and ammoniacal substance with a sufficient residence time to form fine dry crystals of ammonium sulphate from the sulphur oxides;

condensing the moisture of the flue gas with the sulfate crystals by heat exchange to form a condensate solution;

collecting the condensate solution; and recovering ammonium sulphate from the condensate solution.

2. The method of claim 1, wherein the ammoniacal substance is ammonia or ammonium hydroxide.

3. The method of claim 1, which further comprises heating a solution of ammonia or ammonium hydroxide to provide the gaseous ammoniacal substance for introduction into the flue gas.

4. The method of claim 1, wherein the temperature of the flue gas when the ammoniacal substance is injected is at least about 370° F.

5. The method of claim 1, wherein soot and tars are removed from the flue gas prior to the injection of the ammoniacal substance.

6. The method in claim 1, wherein the formation of the fine dry crystals is substantially completed prior to condensing moisture from the flue gas.

7. The method of claim 5 wherein the flue gas is condensed by cooling to form a condensate which contains substantially all of the ammonium sulfate compounds therein.

8. The method of claim 1 wherein the flue gas passes through preheaters and which further comprises introducing the ammoniacal substance into the flue gas stream ahead upstream of preheaters to make a fog of fine ammonium sulfate crystals.

9. The method of claim 1 which further comprises condensing the flue gas by exchanging heat between the flue gas and a cooling fluid through first heat exchanger tubes which carry the cooling fluid.

10. The method of claim 8 which further comprises utilizing ambient temperature water as the cooling fluid and heating the cooling fluid to produce steam.

11. The method of claim 9 which further comprises utilizing the steam to develop power for use in the plant.

12. The method of claim 10 which further comprises utilizing the steam to drive a fan, pump or electric generator to develop power.

13. The method of claim 10 which further comprises utilizing the steam to operate a reciprocating steam pump which pumps water to a hydroelectric generator at between about 5 and 1000 times the pressure per square inch of the steam.

14. The method of claim 1 wherein the gaseous ammoniacal substance is obtained by heating a solution of the ammoniacal substance.

15. The method of claim 13 wherein the ammoniacal substance is a solution of between about 0.5 to 20% by weight of ammonia or ammonium hydroxide and water.

16. The method of claim 1 wherein the gaseous ammoniacal substance is heated to approximately the same temperature as the flue gas prior to introduction thereto.

* * * * *